Jan. 9, 1968 F. DRUSEIKIS 3,362,236
WIPER ACTUATING MECHANISM
Filed Aug. 16, 1965 10 Sheets-Sheet 1

INVENTOR.
FREDERICK DRUSEIKIS
BY W. E. Finken
ATTORNEY

Fig. 10

Jan. 9, 1968  F. DRUSEIKIS  3,362,236
WIPER ACTUATING MECHANISM
Filed Aug. 16, 1965  10 Sheets-Sheet 6

INVENTOR.
FREDERICK DRUSEIKIS
BY W. E. Finken
ATTORNEY

Jan. 9, 1968  F. DRUSEIKIS  3,362,236
WIPER ACTUATING MECHANISM
Filed Aug. 16, 1965  10 Sheets-Sheet 7

INVENTOR.
FREDERICK DRUSEIKIS
BY W. E. Finken
ATTORNEY

Jan. 9, 1968   F. DRUSEIKIS   3,362,236
WIPER ACTUATING MECHANISM
Filed Aug. 16, 1965   10 Sheets-Sheet 9

INVENTOR.
FREDERICK DRUSEIKIS
BY W. E. Finken
ATTORNEY

United States Patent Office 3,362,236
Patented Jan. 9, 1968

3,362,236
WIPER ACTUATING MECHANISM
Frederick Druseikis, Churchville, N.Y., assignor to General Motors Corporation, Detroit, Mich., a corporation of Delaware
Filed Aug. 16, 1965, Ser. No. 479,951
5 Claims. (Cl. 74—76)

ABSTRACT OF THE DISCLOSURE

In a preferred form, the present invention relates to a variable crank throw mechanism involving a drive lug mounted on an eccentric whose position is variable in response to a relay operated latch. The mechanism is particularly adaptable for use in a windshield wiper drive which requires one orbital crank movement for normal operation but which requires a long crank movement to obtain a parking capability.

---

This invention pertains to wiper actuating mechanism, and particularly to an improved mechanism for converting rotation to oscillation including means for varying the stroke of an oscillatory output member so as to move a wiper blade and arm assembly to a depressed parked position.

Heretofore, wiper blade and arm assemblies for cleaning windows have been actuated from either a rotary member or an oscillatory member. The present invention relates to motion coverting mechanism including a variable throw crank assembly for converting rotation to oscillation which is of a unitized construction including an oscillatory output shaft to which a wiper arm and blade assembly can be directly attached. Moreover, the motion converting mechanism can be actuated from either a remotely located rotary power source through a flexible drive shaft or directly coupled thereto. It is to be understood that the actuating mechanism of the present invention can be used for driving a wiper blade assembly or assemblies on all types of vehicles; that is, passenger vehicles, trucks, boats, locomotives, etc., and can be adapted to clean either the windshield or the rear windows thereof.

Accordingly, among my objects are the provision of an improved mechanism for converting rotation to oscillation and wherein the mechanism includes an oscillatory output shaft; the further provision of a motion converting mechanism for actuating a wiper arm and blade assembly including a variable throw crank assembly for extending the stroke of the output shaft beyond the normal running stroke to a depressed park position; and the still further provision of wiper actuating mechanism of the aforesaid type driven by an electric motor for oscillating a wiper blade and arm assembly throughout a running stroke to a depressed parked position and including electromagnetic means for controlling the crank throw and means for deenergizing the motor when the wiper arm and blade assembly is moved to its depressed parked position.

The aforementioned and other objects are accomplished in the present invention by imparting rotation from the motor to a crank assembly. The crank assembly is drivingly connected to an oscillatory output shaft through a reciprocating scotch yoke which has a rack engageble with a pinion on the output shaft. The crank assembly includes an eccentric cam, rotation of which can be arrested under the control of a relay operated latch to increase the throw of the crank and hence move the oscillatory output shaft beyond one end of its normal running stroke to a depressed parked position whereat the rack on the scotch yoke actuates a parking switch to automatically deenergize the motor.

Further objects and advantages of the present invention will be apparent from the following description, reference being had to the accompanying drawings, wherein a preferred embodiment of the present invention is clearly shown and wherein similar numerals depict similar parts throughout the several views.

Figure 1:
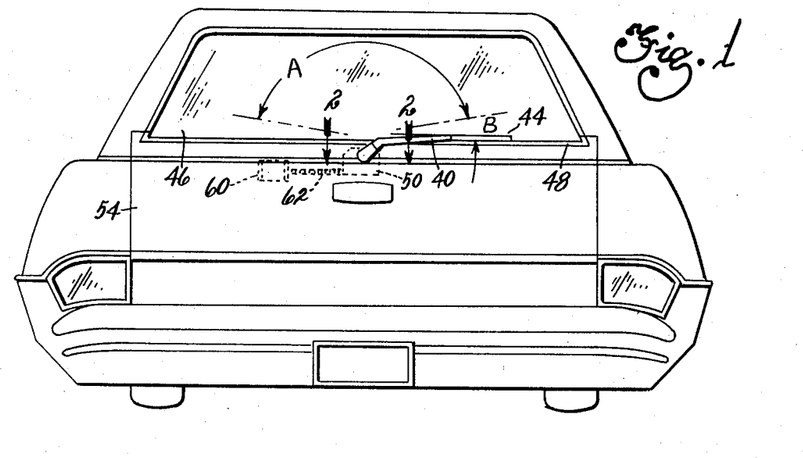
FIGURE 1 is a view in elevation of a vehicle equipped with a rear window wiper driven by the actuating mechanism of the present invention.
Figure 2:
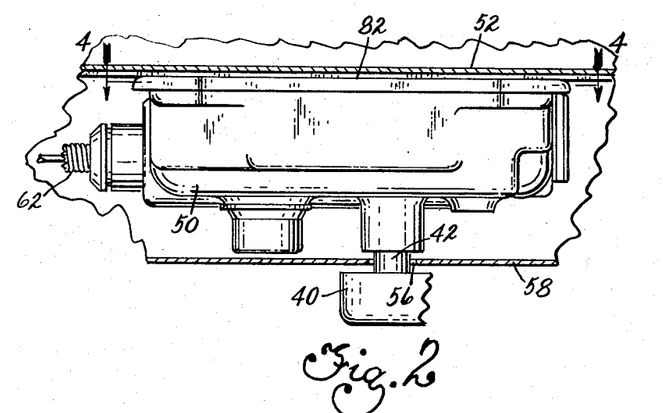
FIGURE 2 is a fragmentary view, partly in section and partly in elevation, taken along the line 2—2 of FIGURE 1.

Referring to FIGURES 1 and 2 of the drawings, the actuating mechanism constructed according to the present invention is illustrated in combination with a vehicle rear window cleaning system including an oscillatable wiper arm 40 having spring hinge connected inner and outer sections, the inner sections of the arm being attached to an oscillatory output shaft 42 mounted on the vertical center line of the vehicle. The wiper arm 40 carries a wiper blade 44 which is movable throughout a running stroke A across the outer surface of the rear window 46, the wiper arm and blade assembly also being movable through a parking stroke B to a depressed park position against the lower rail 48 of the rear window. It is to be understood that the illustrated embodiment depicted for cleaning the rear window of a station wagon-type vehicle is only exemplary, and is not to be construed by way of limitation.

The motion converting mechanism is contained within a housing 50 which is suitably attached to the inner panel 52 of the vehicle tailgate 54, and as shown the output shaft 42 projects through an opening 56 in the outer panel 58 of the tailgate structure 54. A direct current electric motor 60 is remotely located from the motion converting mechanism between the inner and outer panels of the tailgate structure 54, and is coupled to the motion converting mechanism through a flexible drive shaft 62. It is to be understood, of course, that it is within the scope of the present invention to directly couple the electric motor, or other rotary power source, to the motion converting mechanism or to locate the motor in any convenient location within the vehicle and connect it to the motion converting mechanism through a flexible shaft.

Figure 4:
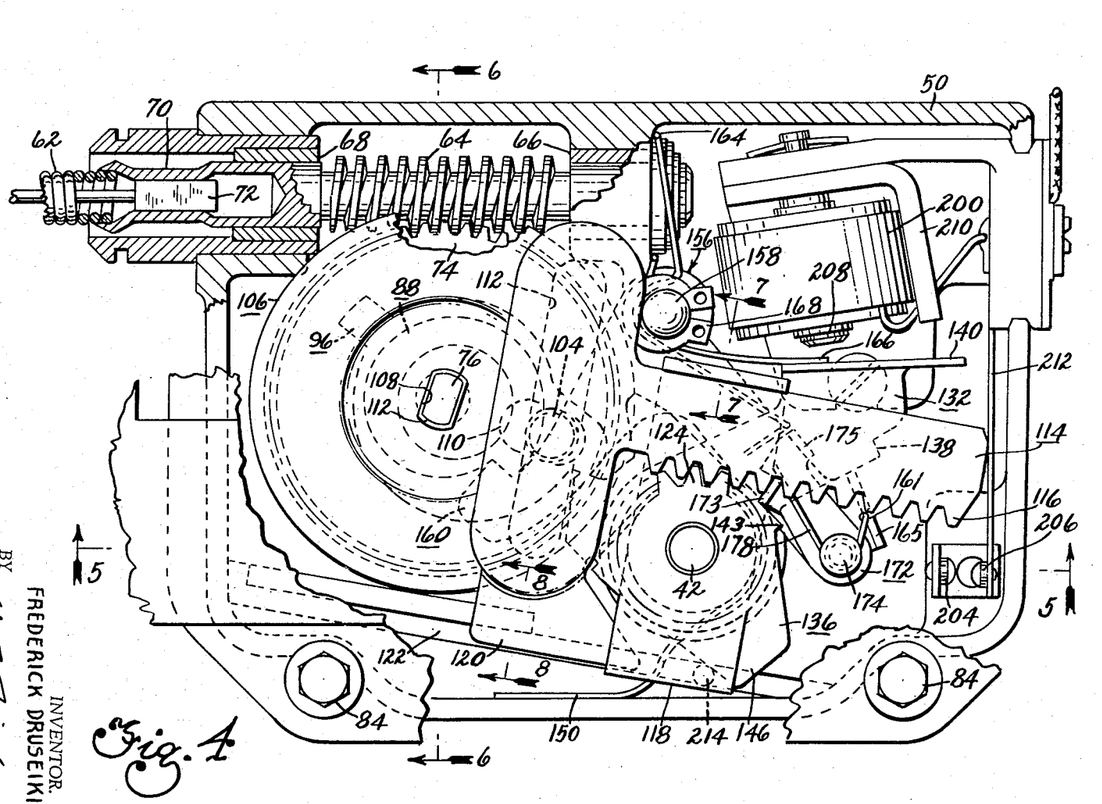
FIGURE 4 is an enlarged, fragmentary view, partly in section and partly in elevation, showing the actuating mechanism in its parked position.
Figures 5, 6:
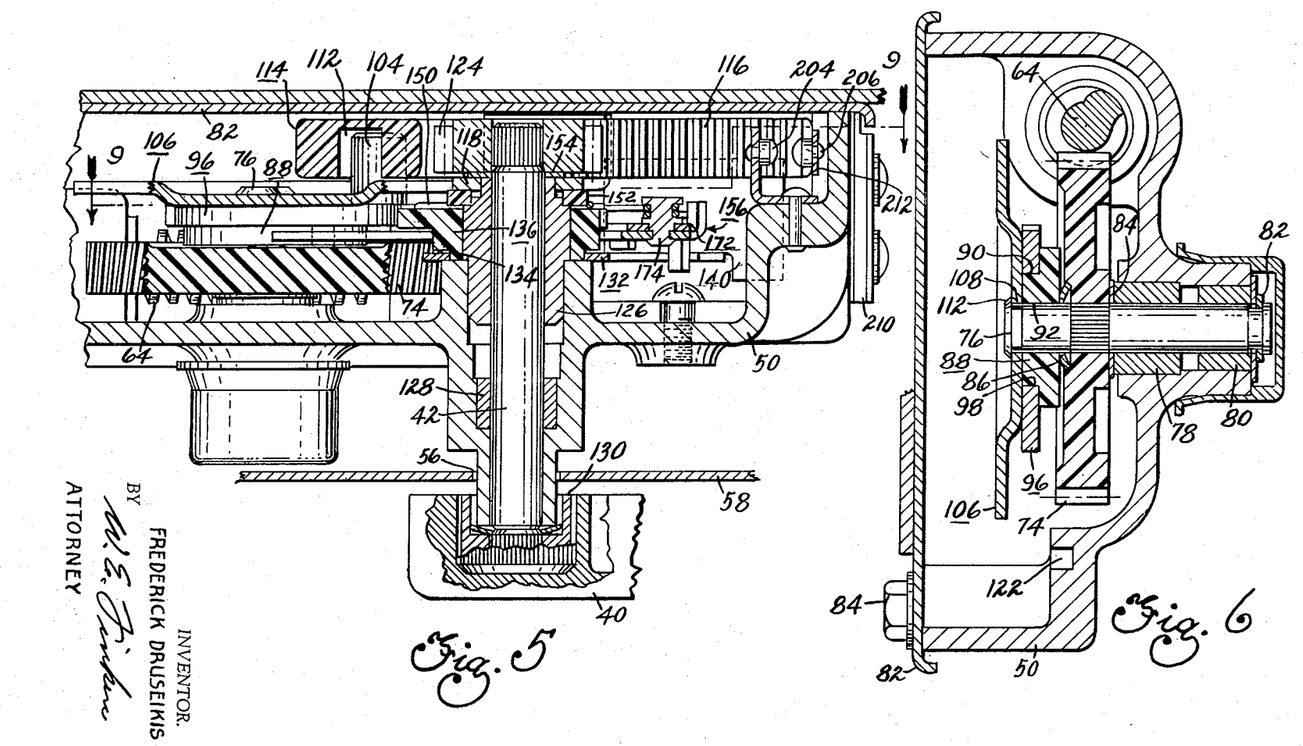
FIGURE 5 is a fragmentary sectional view taken along line 5—5 of FIGURE 4.
FIGURE 6 is a sectional view taken along line 6—6 of FIGURE 4.

Referring to FIGURE 4, as alluded to hereinbefore, the motion converting mechanism is disposed within a die cast metal housing 50 and includes a worm shaft 64 journalled by spaced sleeve bearings 66 and 68 within the housing 50. In the disclosed embodiment the worm shaft 64 is formed with an integral coupling 70 to which a complementary coupling part 72 of the flexible drive shaft can be connected so as to impart rotation to the worm shaft 64. The worm shaft 64 meshes with a worm wheel 74 which, as shown in FIGURE 6, is attached to a stub shaft 76 journalled by sleeve bearings 78 and 80 in the housing 50. The open side of the housing 50 is closed by a sheet metal cover 82 secured thereto by a plurality of bolts 84.

Referring to FIGURES 6 and 14 through 21, the stub shaft 76 is secured against axial movement relative to the housing 50 by a washer and snap ring assembly 82. A washer 84 is interposed between the end of the sleeve bearing 78 and the worm wheel 74, and a spring washer 86 is placed over the shaft 76 on the other side of the worm wheel 74. The shaft 76 also receives an eccentric cam 88 having a cylindrical surface 90 which is eccentric to the cylindrical aperture 92 through which the shaft 76 extends. In addition, the eccentric cam 88 has a radial abutment 94. A crank plate 98 having a cylindrical aperture 98 is journalled on the eccentric cylindrical surface 90 of the eccentric cam 88, the crank plate 96 having substantially diametrically opposed radially extending lugs 100 and 102 and carrying an upstanding crank pin 104. A drive plate 106 is drivingly connected to the shaft 76 by virtue of the D-shaped end of the shaft 76 projecting through the D-shaped opening 108 in the drive plate 106. The drive plate 106, in addition, has an elongated, or obround, radially extending slot 110 through which the crank pin 104 projects. The end of the shaft 76 is peened or upset at 112 over the drive plate 106 as shown in FIGURE 6 to retain the several parts in assembled relation.

Figure 12:
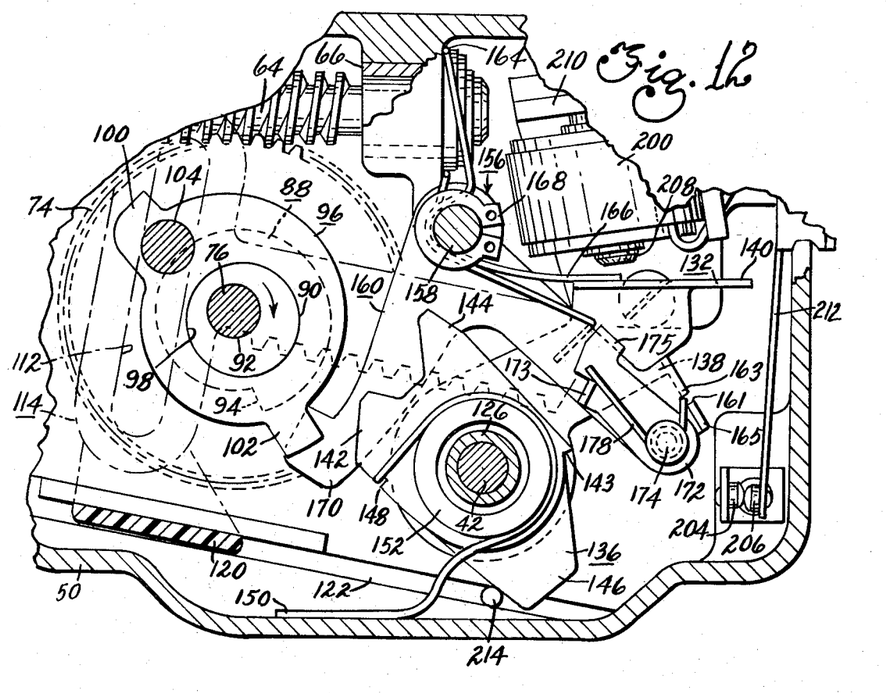
FIGURE 12 is a view similar to FIGURE 9 showing the component parts in the running position.

Accordingly, during rotation of the worm shaft 64 so as to impart rotation to the worm wheel 74 in the clockwise direction as viewed in FIGURE 12, rotation will be imparted to the drive plate 106 which in turn will impart rotation to the crank plate 96 since the crank pin 104 extends through the slot 110 of the drive plate 106. In addition, the spring washer 86 will establish a frictional coupling between the worm wheel 74 and the eccentric cam 88 so that all of the component parts will rotate in unison during normal running operation. Moreover, during normal running operation the eccentric cam 88 will be retained in the position shown in FIGURE 12 whereat the crank pin 104 is located at a minimal radius from the shaft 76 and describes a circular orbit, during rotation of the worm wheel 74, shaft 76, eccentric cam 88, crank plate 96 and the drive plate 106.

Figures 7, 8, 9:
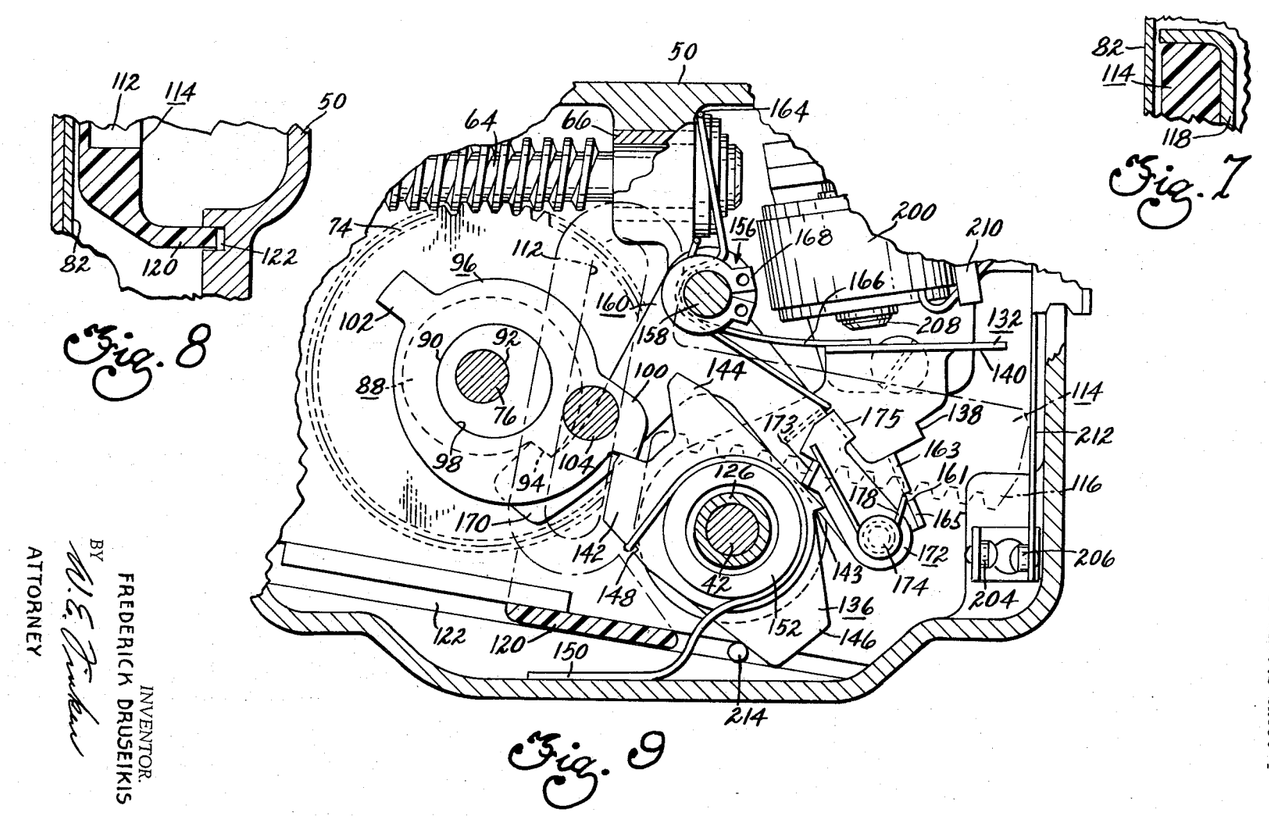
FIGURES 7 and 8 are fragmentary sectional views taken along lines 7—7 and 8—8 of FIGURE 4.
FIGURE 9 is a fragmentary sectional view, partly in section and partly in elevation, taken along line 9—9 of FIGURE 5.

Refering again to FIGURES 4, 7 and 8, the crank pin 96 is received in an elongate slot 112 of a scotch yoke 114 having an integral rack 116. The scotch yoke 114 is supported for rectilinear movement within the housing 50 by a guide, or bracket, 118 which engages the upper edge of the rack portion 116, as shown in FIGURES 4 and 7, and an integral tongue 120 that rides in a rectilinear groove 122 in the housing 50 as shown in FIGURE 8. Accordingly, rotation of the crank plate 96 and the crank pin 104 will impart reciprocation to the scotch yoke 114 and its rack 116. The rack 116 meshes with a pinion 124 which is connected to the output shaft 42. As seen particularly in FIGURE 5, the output shaft 42 is journalled by spaced sleeve bearings 126 and 128 in the housing 50 and carries a serrated drive burr 130 to which the inner section of the wiper arm 40 is detachably connected.

Refering to FIGURES 22 through 30, certain components of the control mechanism for the variable throw crank assembly are pivotally mounted on the sleeve bearing 126. Thus, a release lever 132 is pivotally mounted on the hub 134 of a reset cam 136. The reset cam 136 is journalled on the sleeve bearing 126. The release lever 132 is formed with a shoulder 138 and a flanged end 140. The reset cam 136 is formed with lobes 142, 144 and 146, a shoulder 143 and a spring seat 148. The flange 140 of the release lever 132 is also formed with a spring seat 141. The reset cam 136 is normally biased in the counterclockwise direction by a hairpin spring 150 as will be pointed out more particularly hereinafter. A washer 152 is mounted on an offset shoulder of the bearing 126. The rack guide 118 is supported on the shaft 42 and washer 154 overlies the rack guide 118. The pinion 124 is attached to the serrated portion of the shaft 142.

Figures 31, 32, 33, 34, 35, 36, 37:
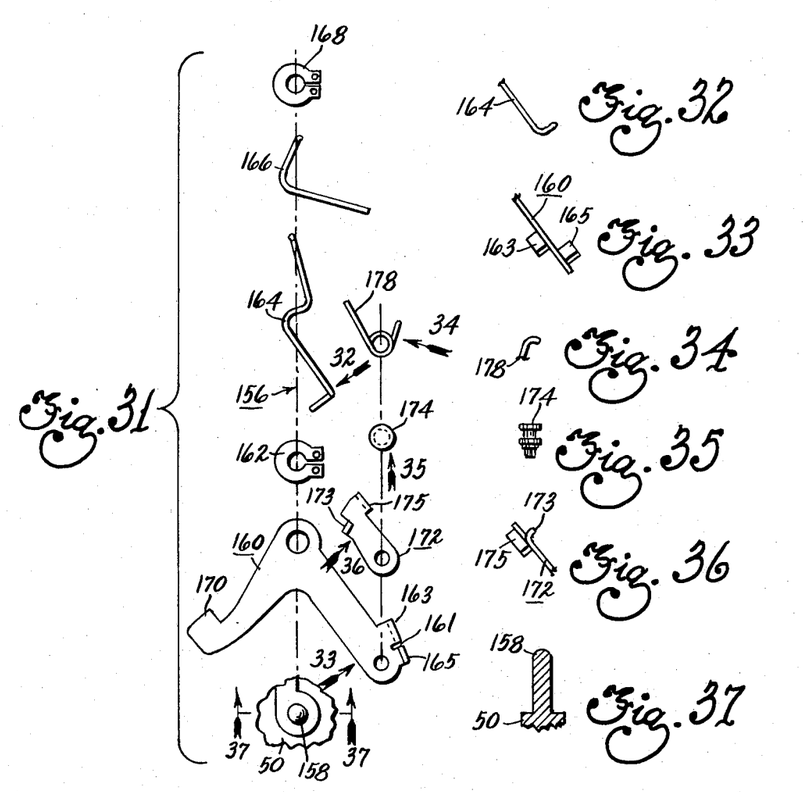
FIGURE 31 is an exploded view of the component parts of the latch assembly shown in the parked position.
FIGURES 32, 33, 34, 35 and 36 are views in elevation taken in the direction of arrows 32, 33, 34, 35 and 36 of some of the component parts of the latch assembly shown in FIGURE 31.
FIGURE 37 is a sectional view taken along line 37—37 of the boss shown in FIGURE 31.

Referring again to FIGURE 4, a latch lever assembly 156 is mounted on an upstanding boss 158 of the housing, and this assembly is shown in FIGURES 31 through 37. The latch lever assembly comprises a latch lever 160 pivotally mounted on the upstanding boss 158 and restrained against axial movement by a retainer ring 162. Two hairpin springs 164 and 166 are supported around the boss 158 and restrained against axial movement by a second retainer ring 168. Spring 164 bisects the latch arm assembly 156 in the clockwise direction. Spring 166 biases the release lever 132. The latch lever 160 has a projecting lug 170 on one leg thereof, and the second leg pivotally supports a secondary latch lever 172 on a pin 174, the secondary latch lever 172 being biased in the counterclockwise direction relative to the latch lever 160 by a torsion spring 178 which is mounted on the pin 174 and the ends engage respectively the latch lever 160 and the lug 173 on the secondary latch lever 172. The outturned end of the torsion spring 178 as seen in FIGURE 34 is seated in a slot 161 of the latch lever 160 which is formed with oppositely extending flange portions 163 and 165 as shown in FIGURE 33. The secondary latch lever 172 is also formed with a stop lug 175.

Figure 3:
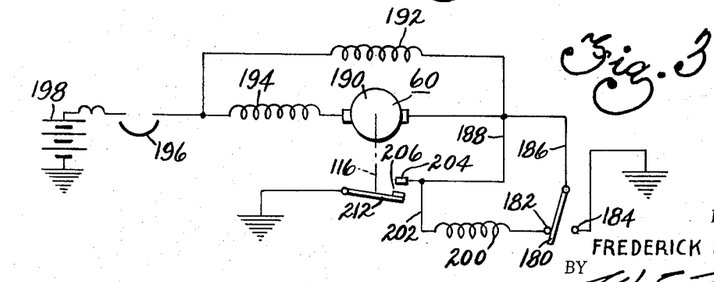
FIGURE 3 is an electrical schematic of the control circuit for the actuating mechanism.

Referring to FIGURE 3, the control system for the actuating mechanism includes a manually operable "on," "off" switch having a movable contact 180 and a pair of stationary contacts 182 and 184. Contact 184 is connected to ground. Movable contact 180 is connected to wires 186 and 188, wire 186 being connected to one terminal of the motor 60. The motor includes an armature 190, a shunt field winding 192 and a series field winding 194, and the other terminal of the motor is connected through a thermal overload circuit breaker 196 to one terminal of a battery 198, and the other terminal of which is grounded. Stationary contact 182 is connected to one end of a coil 200 of a relay, or electromagnet, the other end of which is connected to wire 188 through wire 202. Wire 188 is connected to a stationary contact 204 of a parking switch, the contact 204 being engageable with a leaf spring carried contact 206 which is inherently biased into engagement with the stationary contact 204. The movable contact 206 is connected to ground, and can be moved out of engagement with the stationary contact 204 by the rack 116 which is diagrammatically indicated by the dotted line in FIGURE 3.

Referring to FIGURE 4, the coil 200 is wound around an electromagnetic core 208 supported on a bracket 210 in the housing 50. The armature of the electromagnet comprises the flanged edge 140 of the release lever 132, such that when the coil 200 is energized the release lever 132 will be attracted by the core 208 and moved to the position shown in FIGURE 13. The parking switch is also disposed within the housing 50 with the stationary contact 204 mounted on a terminal lug and movable contact 206 carried by a leaf spring 212 which is inherently biased towards the stationary contact 204.

The motion converting mechanism is shown in its running position in FIGURE 12, from which it can be seen that the parking switch comprising contacts 204 and 206 is closed and the electromagnet comprising the coil 200 and the core is deenergized. As seen in FIGURE 12, the hairpin spring 166 engages the flanged portion 140 of the release lever 132 so as to bias the release lever 132 in the clockwise direction about the shaft 42. In the running position the latch lever 160 is held in position wherein the lug 170 is out of the path of movement of the eccentric cam abutment 94 by virtue of the lug 163 engaging the shoulder 138 of the latch release lever 132. The hairpin spring 164 biases the latch lever 160 in the clockwise direction, but movement of the latch lever 160 is precluded by engagement between the lug 163 and the shoulder 138. Accordingly, the lug 170 of the latch release lever will not intercept the abutment 94 on the eccentric cam 88 during rotation thereof. Similarly, the reset cam 138 is biased in the clockwise direction by spring 150 to a position whereat lobe 146 abuts housing stop 214, and in this position the reset cam lobes 142 and 144 will not intercept either of lugs 100 and 102 of the crank plate assembly 96. Consequently, the radius of the crank pin 104 will remain at a minimum distance from the axis of the shaft 76 and describe a circular orbit during rotation of the crank plate assembly with the eccentric 88 and the drive plate 106. Thus, reciprocation will be imparted to the scotch yoke 114, which through its rack 116 will impart oscillation to the output shaft 42 so as to move the wiper blade and arm assembly through its running stroke A as depicted in FIGURE 1.

Figure 13:
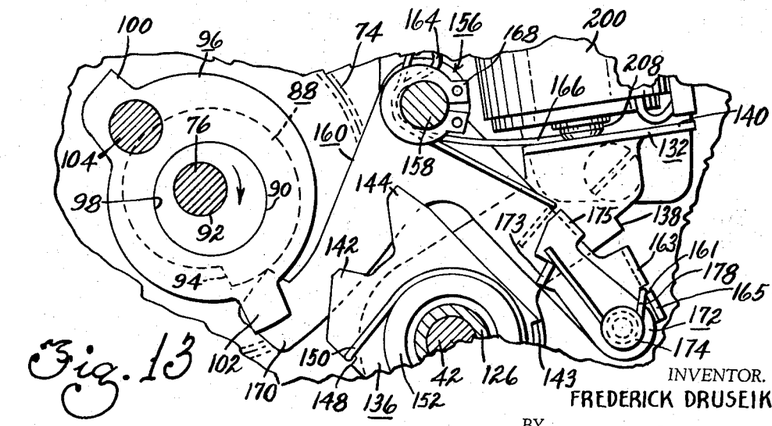
FIGURE 13 is a fragmentary view similar to FIGURE 9 showing the interaction of the parts going into the parked position.
Figures 14, 15, 16, 17, 18, 19, 20, 21:
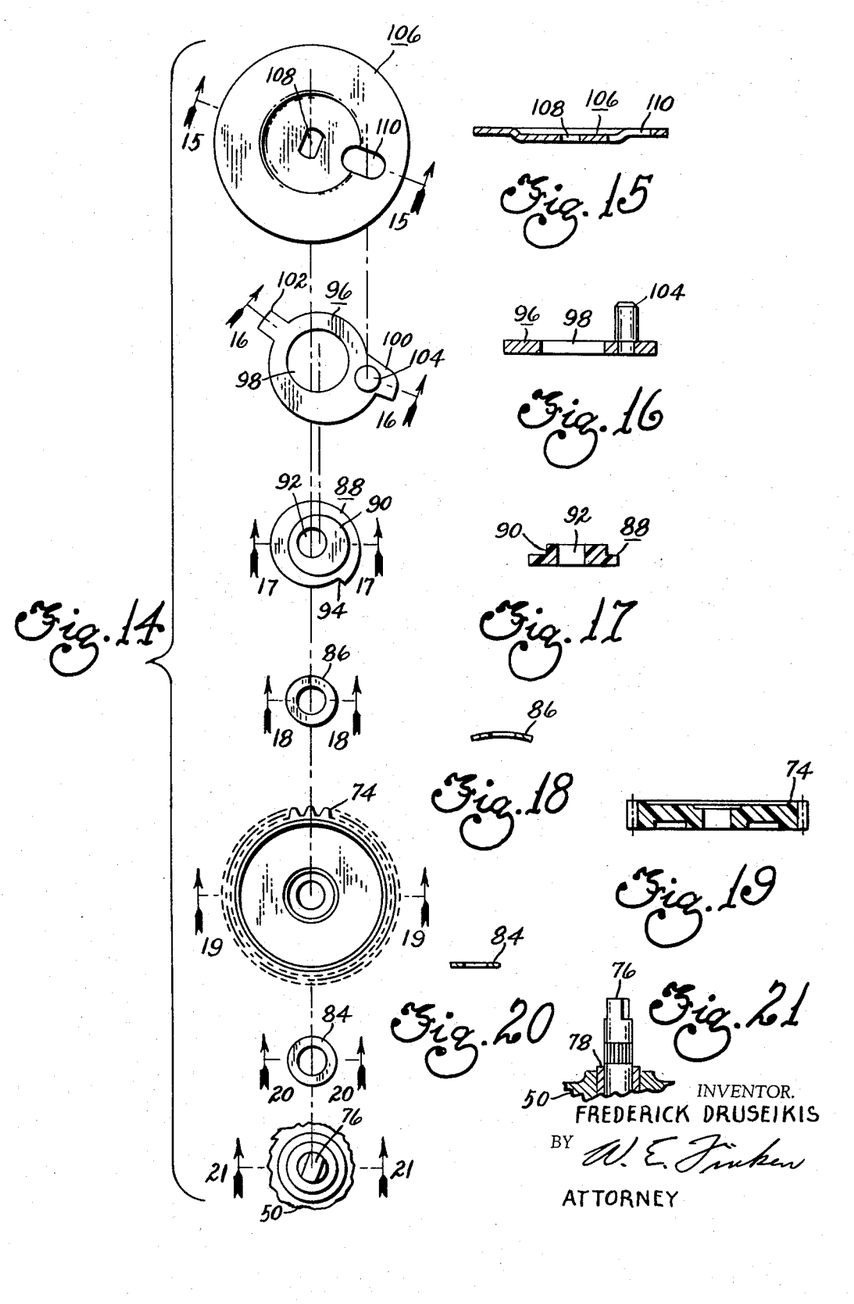
FIGURE 14 is an exploded view of the crank assembly components showing the parked position.
FIGURES 15 through 21 are sectional views, respectively, taken along lines 15—15, 16—16, 17—17, 18—18, 19—19, 20—20 and 21—21 of the components shown in FIGURE 14.
Figure 22:
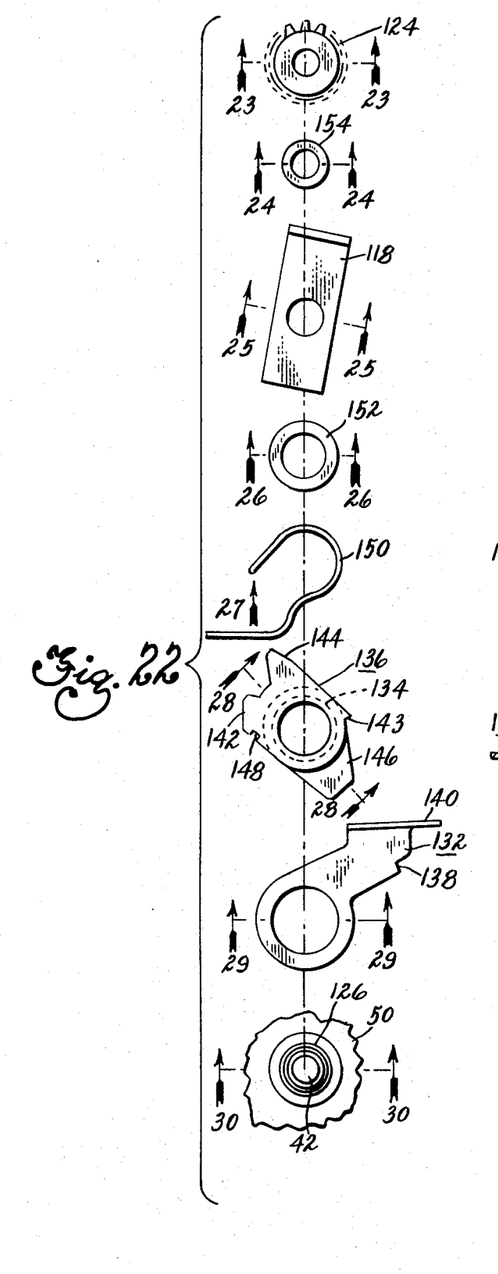
FIGURE 22 is an exploded view of the component parts of the output shaft assembly in the parked position.
Figure 23:
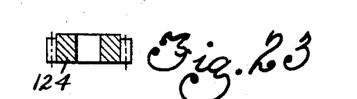
FIGURES 23, 24, 25, 26, 28, 29 and 30 are sectional views, respectively, taken along lines 23—23, 24—24, 25—25, 26—26, 28—28, 29—29 and 30—30 of the components shown in FIGURE 22.
Figure 24:
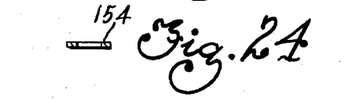
Figure 25:
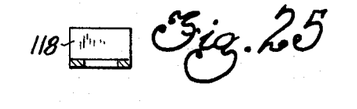
Figure 26:
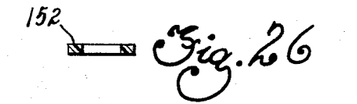
Figure 27:
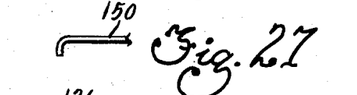
FIGURE 27 is a fragmentary view in elevation taken in the direction of arrow 27 of FIGURE 22.
Figure 28:
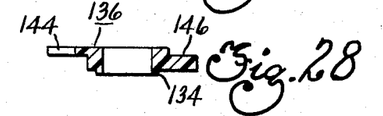
Figure 29:
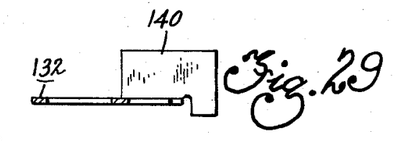
Figure 30:
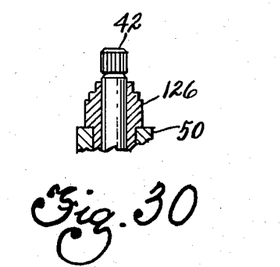

When it is desired to discontinue operation of the actuating mechanism, the manual switch contact 180 is moved out of engagement with contact 184 and into engagement with contact 182 as seen in FIGURE 3. The motor 60 will continue to be energized from the battery through the normally closed parking switch contacts 204 and 206. Moreover, at this time the electromagnet coil 202 will be energized so as to attract the release lever 132 as shown in FIGURE 13. When the release lever is in engagement with the electromagnet, shoulder 138 is disengaged from lug 163 of the latch lever 160, and hence the spring 164 will move the latch lever assembly 156 in the clockwise direction so that the lug 170 is positioned to intercept abutment 94 during continued movement of the eccentric cam 88 as shown in FIGURE 13. When the lug 170 engages the abutment 94 of the eccentric cam 88, rotation of the eccentric cam is arrested and during continued rotation of the drive plate 106 and the crank plate 96 throughout 180°, the crank pin 104 is moved radially outward in the slot 110 so as to increase the crank throw to a maximum. In other words, the orbit of the crank pin is changed as the throw increases. The increasing crank throw will impart extended movement to the scotch yoke 114 such that the end of the rack 116 will engage the leaf spring 212 and open the parking switch contacts 204 and 206 thereby deenergizing the motor 60 and the coil 200. Moreover, since the throw of the crank has been increased, the stroke of the output shaft 42 and the wiper arm and blade assembly is likewise increased to move the wiper arm and blade assembly from the outboard stroke end limit through angle A as well as through the parking angle B to a depressed parked position. The parked position of the actuating mechanism is shown in FIGURE 4.

Figure 10:
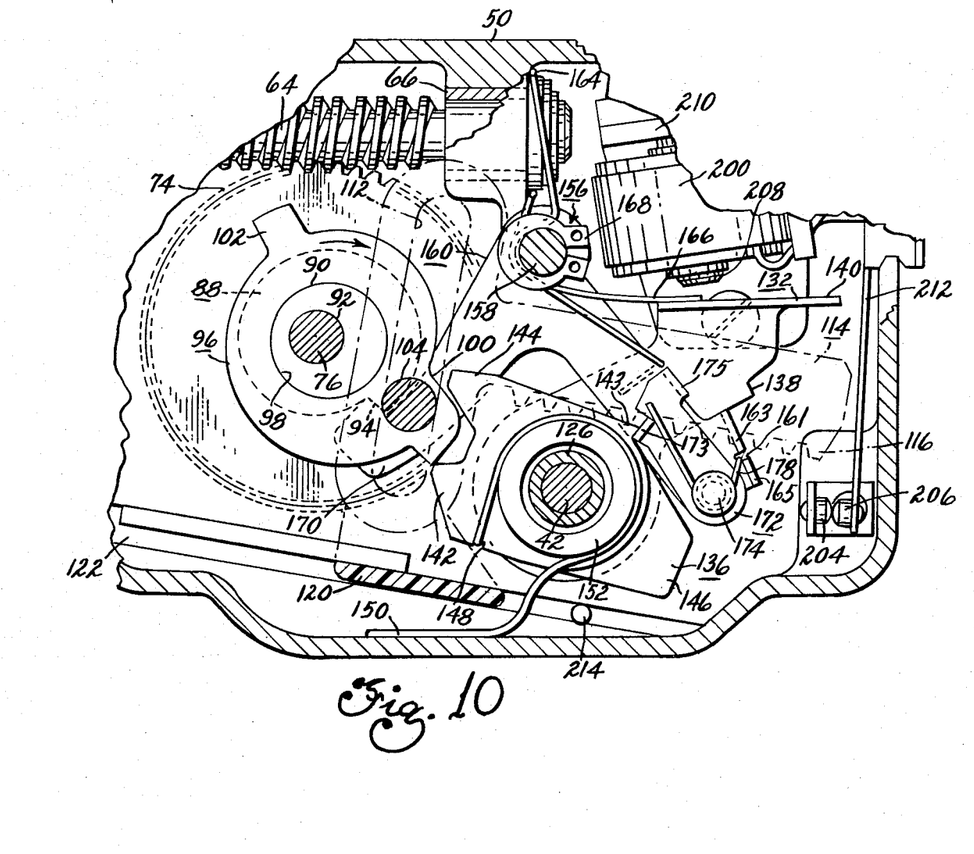
FIGURE 10 is a view similar to FIGURE 9 depicting the interaction of the several components of the mechanism in a first position coming out of the parked position.

In order to restart the mechanism, the manual movable switch contact 180 must be moved out of engagement with contact 182 and into engagement with contact 184 thereby reenergizing the motor 60 and imparting rotation to the worm shaft 64 and worm wheel 74. Rotation of the worm wheel will rotate the drive plate 106 and the crank plate 96 in the clockwise direction. Referring to FIGURE 10, as the crank plate 96 is rotated in the clockwise direction from its parked position, lug 100 thereof will engage lobe 142 of the reset cam 136 thereby moving the reset cam in the counterclockwise direction so that shoulder 143 on the reset cam engages shoulder 173 on the secondary latch lever 172. The secondary latch lever 172 is biased in the counterclockwise direction by the torsion spring 178 so as to assure positive engagement between the lever 172 and the shoulder 143 and the reset cam 136 so that the lobe 144 of the reset cam 136 is moved into a position to intercept lug 102 on the crank plate 96 during continued rotation thereof.

Figure 11:
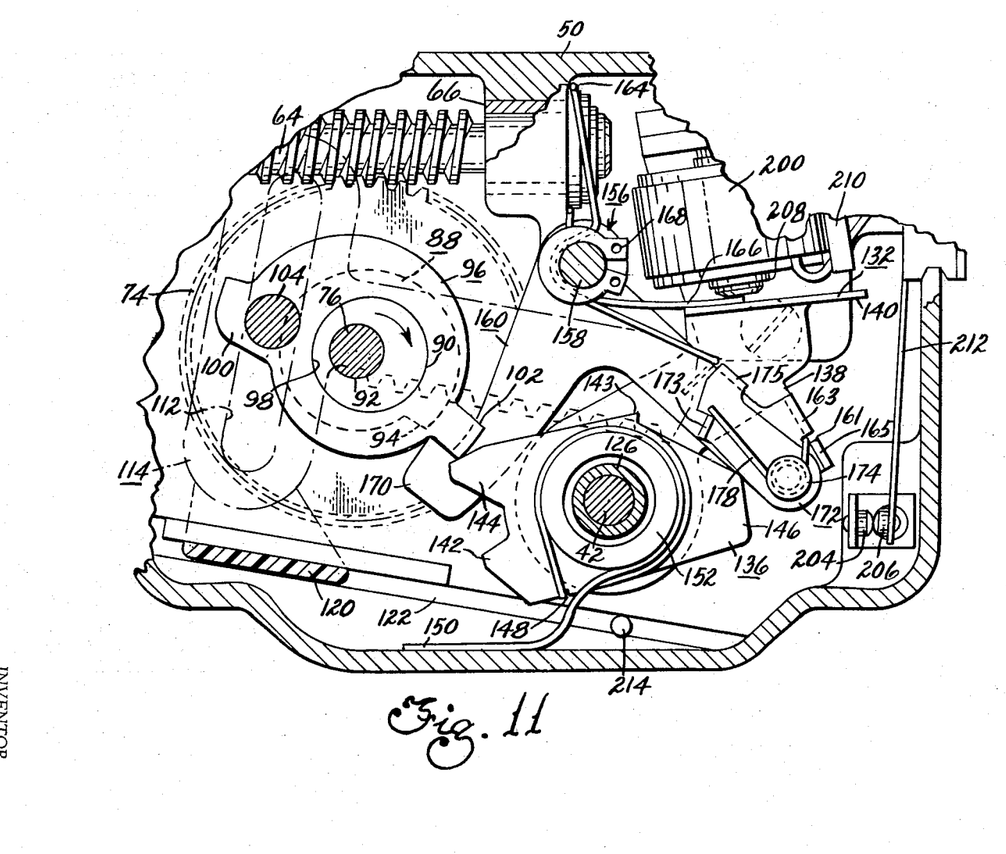
FIGURE 11 is a view similar to FIGURE 9 showing the interaction of the parts in a second position coming out of the parked position.

Referring to FIGURE 11, after the crank plate assembly has rotated 180° in the clockwise direction from the parked position of FIGURE 4, the lug 102 thereof will engage the lob 144 of the reset cam 136 thereby imparting further movement of the reset cam in the counterclockwise direction so as to engage lobe 146 of the reset cam 136 with the latch lever 160 and thereby withdrawing the lug 170 and disengaging it from the abutment 94 on the eccentric cam 88. As soon as the crank plate 96 has rotated 180° relative to the eccentric cam from the parked position, the throw of the crank pin 104 is again minimal and will described a circuit orbit, and hence the entire assembly including the eccentric cam, drive plate and crank plate will rotate as a unit. During continued rotation from the position of FIGURE 11 to the position of FIGURE 12, the reset cam 136 is rotated further in the counterclockwise direction and the lobe 146 thereof moves the reset lever 160 to a position where the lug 163 will reengage the shoulder 138 on the release lever 132 so as to retain the latch lever assembly 156 in its inoperative position. As the reset cam 136 continues movement in the counterclockwise direction from the position of FIGURE 11, the latch lever 160 over-travels the shoulder 138 of the release lever 132, but since the release lever 132 is biased by a spring 166, the shoulder 138 on the release lever will drop under the lug 163 of the latch lever to hold it in an inoperative position. As the lug 102 on the crank plate 96 is thereafter disengaged from the cam lobe 144 on the reset cam, the reset cam will move to the position shown in FIGURE 12 under the urge of the torsion spring 150 so that all component parts of the mechanism will be in the running position.

From the foregoing it is apparent that the present invention provides a compact motion converting mechanism including a variable throw crank assembly which comprises a driving member comprising the worm wheel and shaft upon which the eccentric cam is rotatably journalled. The eccentric cam is frictionally coupled through the spring washer to normally rotate with the driving member, and the crank plate is journalled on the eccentric cam and connected to rotate with the driving member through the drive plate. As long as the eccentric cam is permitted to rotate with the drive member, the throw of the crank remains constant and at a minimal radial distance from the axis of the driving member. However, when rotation of the eccentric cam is arrested by the latch lever, continued rotation of the driving member and the crank through 180° will increase the throw of the crank to a maximum radial distance from the axis of the driving member whereat the mechanism will be arrested. Upon restarting of the mechanism, the driving member rotates the crank back to its original position relative to the eccentric, that is through an additional 180° so as to reposition the crank at its minimum throw position whereat the eccentric cam is released so as to again rotate with the driving member.

While the embodiment of the invention as herein disclosed constitutes a prefered form, it is to be understood that other forms might be adopted.

What is claimed is as follows:

1. Wiper actuating mechanism including, a housing, a rotatable shaft journalled on said housing, a gear attached to said shaft for imparting rotation thereto, an eccentric journalled on said shaft and drivingly coupled to said gear so as to normally rotate therewith, said eccentric having a peripheral abutment, a crank plate journalled on said eccentric and having an upstanding crank pin, a drive plate connected to said shaft and having an elongate radial slot receiving said crank pin for imparting rotation to said crank plate during rotation of said shaft, latch means pivotally mounted in said housing and spring biased towards engagement with the abutment on said eccentric, a lever pivotally mounted in said housing and engageable with said latch means for precluding movement thereof so as to engage the abutment on said eccentric, and an electromagnet which, when energized, attracts said lever to disengage the lever from the latch means so as to permit the latch means to engage the abutment on said eccentric and arrest rotation of said eccentric during continued rotation of said crank plate so as to vary the orbit of said crank pin.

2. The wiper actuating mechanism set forth in claim 1 wherein said crank plate is formed with a pair of substantially diametrically opposed peripheral lugs, a reset cam pivotally mounted coaxially with said lever and having a pair of cam lobes sequentially engageable with the lugs on said crank plate and a third cam lobe engageable with said latch means for withdrawing said latch means from engagement with the abutment on said eccentric during continued rotation of said crank plate relative to said eccentric.

3. The wiper actuating mechanism set forth in claim 2 wherein said latch means comprises a lever having a pair of diverging legs, one of said legs having a lug engageable with an abutment on said eccentric.

4. The wiper actuating mechanism set forth in claim 3 wherein the other leg of said latch means has a secondary latch lever pivotally attached thereto and engageable with an abutment on said reset cam for holding said release cam in an intermediate position.

5. The wiper actuating mechanism set forth in claim 4 wherein said reset cam is spring biased in one direction and is movable in the opposite direction by the lugs on said crank plate, and wherein said secondary latch lever on said latch means retains said reset cam in an intermediate position against the bias of said spring in the interval between sequential engagement of said pair of lobes of said release cam by the lugs on said crank plate.

References Cited

UNITED STATES PATENTS

| | | | |
|---|---|---|---|
| 2,856,783 | 10/1958 | Reese | 15—250.17 X |
| 2,949,035 | 8/1960 | Harrison | 15—250.17 X |
| 3,282,120 | 11/1966 | Compton | 74—600 X |

FOREIGN PATENTS 775,629  5/1957  Great Britain.

FRED C. MATTERN, JR., *Primary Examiner.*

W. S. RATLIFF, *Assistant Examiner.*

UNITED STATES PATENT OFFICE

CERTIFICATE OF CORRECTION

Patent No. 3,362,236                     January 9, 1968

Frederick Druseikis

It is hereby certified that error appears in the above numbered patent requiring correction and that the said Letters Patent should read as corrected below.

Column 1, line 17, for "long" read -- longer --; line 64, for "engageble" read -- engageable --; column 4, line 18, for "Refering" read -- Referring --; line 43, for "bisects" read -- biases --; column 6, line 28, for "lob" read -- lobe --; line 36, for "circuit" read -- circular --; column 7, line 7, for "prefered" read -- preferred --.

Signed and sealed this 11th day of March 1969.

(SEAL)
Attest:

Edward M. Fletcher, Jr.                    EDWARD J. BRENNER Attesting Officer                        Commissioner of Patents